United States Patent
Young

(10) Patent No.: US 10,373,049 B2
(45) Date of Patent: *Aug. 6, 2019

(54) GENERATING AN OUTPUT FOR A NEURAL NETWORK OUTPUT LAYER

(71) Applicant: Google LLC, Mountain View, CA (US)

(72) Inventor: Reginald Clifford Young, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/385,642

(22) Filed: Dec. 20, 2016

(65) Prior Publication Data

US 2018/0174022 A1 Jun. 21, 2018

(51) Int. Cl.
  *G06E 1/00* (2006.01)
  *G06E 3/00* (2006.01)
  (Continued)

(52) U.S. Cl.
  CPC ............. *G06N 3/0454* (2013.01); *G06N 3/04* (2013.01); *G06N 3/063* (2013.01); *G06N 7/005* (2013.01)

(58) Field of Classification Search
  CPC .......... G06N 3/04; G06N 3/0454; G06N 3/08; G06N 3/084; G06N 99/005; G06N 5/04;
  (Continued)

(56) References Cited

U.S. PATENT DOCUMENTS

2003/0236662 A1 12/2003 Goodman
2010/0094787 A1* 4/2010 Bouchard ............... G06F 17/10
                                                                706/19
(Continued)

FOREIGN PATENT DOCUMENTS

WO    WO 2016/039651    3/2016

OTHER PUBLICATIONS

Hwang, Kyuyeon, and Wonyong Sung. "Fixed-point feedforward deep neural network design using weights+ 1, 0, and− 1." In Signal Processing Systems (SiPS), 2014 IEEE Workshop on, pp. 1-6. IEEE, 2014.*

(Continued)

*Primary Examiner* — Luis A Sitiriche
(74) *Attorney, Agent, or Firm* — Fish & Richardson P.C.

(57) ABSTRACT

Systems, methods, and apparatus, including computer programs encoded on a computer storage medium for processing a network input through a neural network having one or more initial neural network layers followed by a softmax output layer. In one aspect, the methods include obtaining a layer output generated by the one or more initial neural network layers and processing the layer output through the softmax output layer to generate a neural network output. Processing the layer output through the softmax output layer includes determining, for each possible output value, a number of occurrences in the layer output values; for each possible output value occurring in the layer output values, determining a respective exponentiation measure; determining a normalization factor for the layer output by combining the exponentiation measures in accordance with the number of occurrences of the possible output values; and determining, for each of layer output values, a softmax probability value.

20 Claims, 3 Drawing Sheets

(51) Int. Cl.
*G06F 15/18* (2006.01)
*G06G 7/00* (2006.01)
*G06N 3/04* (2006.01)
*G06N 3/063* (2006.01)
*G06N 7/00* (2006.01)

(58) Field of Classification Search
CPC ...... G06N 3/02; G06N 3/0445; G06N 3/0472; G06N 3/063; G06N 3/0427; G06N 3/049; G06N 3/082; G06N 5/025; G06N 3/0635
See application file for complete search history.

(56) References Cited

U.S. PATENT DOCUMENTS

2016/0063359 A1  3/2016  Szegedy et al.
2017/0068887 A1* 3/2017  Kwon ..................... G06N 3/04

OTHER PUBLICATIONS

Gupta, Suyog, Ankur Agrawal, Kailash Gopalakrishnan, and Pritish Narayanan. "Deep Learning with Limited Numerical Precision." In ICML, pp. 1737-1746. 2015.*

Grave et al. "Efficient softmax approximation for GPUs," arXiv preprint ar Xiv, Dec. 13, 2016, 1609.04309.

Graham. "Spatially-sparse convolutional neural networks," arXiv preprint arXiv, Sep. 23, 2014, 1409.6070.

'Stackoverflow.com' [online]. "How to vectorize equations?," Feb. 2012, [retrieved on Dec. 16, 2016] Retrieved from the Internet: URL<http://stackoverflow.com/questions/9381271/how-to-vectorize-equations> . 4 pages.

'Groups.google.com' [online]. "Language modeling slow with softmax," Feb. 15, 2015 [retrieved on Dec. 16, 2016] retrieved from the internet: URLhttps://groups.google.com/forum/#!topic/pylearn-users/4jcXu3kyl5c 2 pages.

'Github.com' [online] "Support negative sampling," Mar. 14, 2015 [retrieved on Dec. 16, 2016] Retrieved from the Internet: URLhttps://github.com/lisa-lab/pylearn2/pull/1406> 4 pages.

'Stanford.edu' [online] "Maximum Entropy Models/Softmax Classifiers" [retrieved on Dec. 16, 2016] Retrieved from the Internet: URL<http://web.stanford.edu/class/cs224n/handouts/MaxentTutorial-16x9-MEMMs-Smoothing.pdf> 53 pages.

'Wikipedia.org' [online] "Softmax function," Dec. 6, 2016, [retrieved on Jan. 16, 2018] Retrieved from Internet: URL<https://en.wikipedia.org/w/index.php?title=softmax_function&oldid=753323509> 4 pages.

International Search Report and Written Opinion issued in International Application No. PCT/US2017/058596, dated Jan. 26, 2018, 17 pages.

Widrow et al. "Quantization Noise: Roundoff Error in Digital Computation, Signal Processing, Control, and Communications, Chapter 12" Jan. 1, 2018, 50 pages.

Written Opinion issued in International Application No. PCT/US2017/058596, dated Nov. 26, 2018, 10 pages.

* cited by examiner

GENERATING AN OUTPUT FOR A NEURAL NETWORK OUTPUT LAYER

BACKGROUND

This specification relates to generating outputs for neural network output layers.

Neural networks are machine learning models that employ one or more layers of nonlinear units to predict an output for a received input. Some neural networks include one or more hidden layers in addition to an output layer. The output of each hidden layer is used as input to another layer in the network, i.e., the next hidden layer or the output layer. Each layer of the network generates an output from a received input in accordance with current values of a respective set of parameters.

SUMMARY

This specification describes how a system can process the output of a neural network. To do so, the system determines the number of occurrences of each member of a finite set of potential output values among the output generated by the initial neural network layers of the neural network. The system determines a softmax layer output for each value occurring in the output of the initial neural network layers by determining a respective exponentiation measure for each occurring value.

In general, one innovative aspect of the subject matter described in this specification can be embodied in methods of processing a network input through a neural network having one or more initial neural network layers followed by a softmax output that include the actions of obtaining a layer output generated by processing the network input through the one or more initial neural network layers, the layer output having a plurality of layer output values and each layer output value being a respective one of a predetermined finite set of possible output values; and processing the layer output through the softmax output layer to generate a neural network output for the network input, including determining, for each possible output value in the predetermined finite set, a number of occurrences of the possible output value in the plurality of layer output values; for each possible output value occurring in the plurality of layer output values, determining a respective exponentiation measure of the possible output value; determining a normalization factor for the layer output by combining the exponentiation measures in accordance with the number of occurrences of the possible output values; and determining, for each of the plurality of layer output values, a softmax probability value from the respective exponentiation measure for the layer output value and the normalization factor.

Other embodiments of this aspect include corresponding computer systems, apparatus, and computer programs recorded on one or more computer storage devices, each configured to perform the actions of the methods. A system of one or more computers can be configured to perform particular operations or actions by virtue of software, firmware, hardware, or any combination thereof installed on the system that in operation may cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In particular, one embodiment includes all the following features in combination.

In some implementations, obtaining the layer output includes receiving a plurality of initial layer output values from a processing system that does the processing for the one or more initial neural network layers, the plurality of initial layer output values being unmapped output values of the one or more initial neural network layers; obtaining mapping data defining a mapping from the plurality of initial layer output values to the plurality of layer output values; and determining, for each initial layer output value, a layer output value based on the mapping data. In some of those implementations, the mapping data specifies a scaling factor for scaling each of the plurality of initial layer output values to generate the layer output values.

In some implementations, the layer output is generated by a processing device that performs computation specified by the one or more initial neural network layers using quantized arithmetic. In some implementations, the layer output is generated by a processing device that performs computation specified by the one or more initial neural network layers using fixed-point arithmetic.

In some implementations, each of the finite set of possible output values map to a respective value of an integer data type. In some implementations, the methods further include generating the network input by converting one or more floating point values to fixed point values. In some implementations, determining the respective exponentiation measure of the possible output value includes exponentiating Euler's number by a multiplication of each respective possible output value. In some implementations, each softmax probability value is determined by dividing each respective exponentiation measure by the normalization factor.

In some implementations, each of the finite set of possible output values is an output of a mapping function. In some implementations, each of the finite set of possible output values is an output of a compression function.

Particular embodiments of the subject matter described in this specification can be implemented so as to realize one or more of the following advantages. The computational complexity of determining an output of a softmax output layer of a neural network can be reduced. In processing systems that perform computations using quantized arithmetic, the range of potential values on which operations can be performed is limited by the range of countable values to which a set of values are mapped. Particular implementations of the subject matter described in this specification leverage this quality of such processing systems by pre-computing normalized values for countable values that occur among the output of the neural network, thus increasing the efficiency of normalizing output values of neural networks. In these implementations, precomputing the value of exponentiation measures needed for computing normalized values can eliminate the need for hardware or software support for exponentiation operations.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
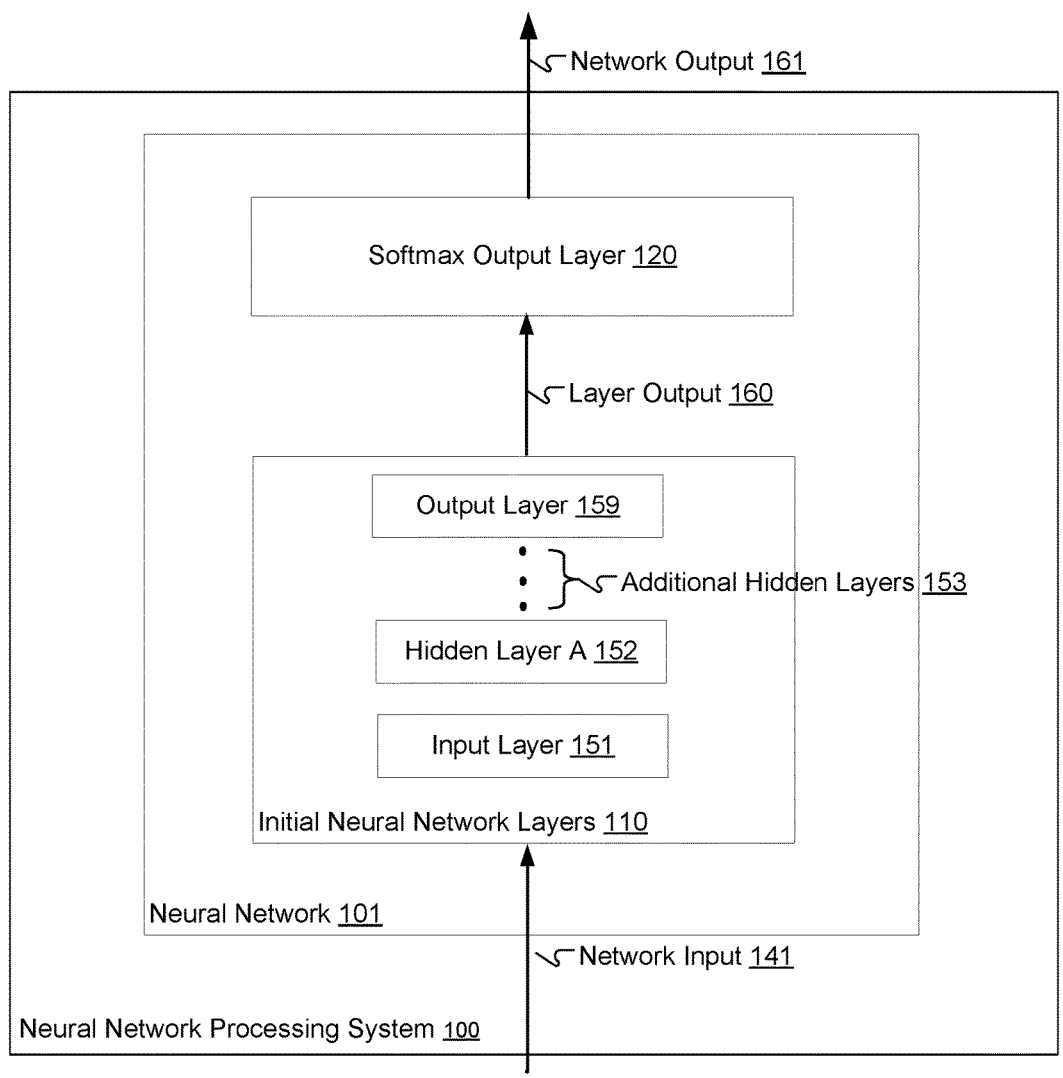
FIG. 1 shows an example neural network processing system.

FIG. 1 shows an example neural network processing system 100. The neural network processing system 100 is an example of a system implemented as computer programs on one or more computers in one or more locations, in which the systems, components, and techniques described below are implemented.

The neural network processing system 100 includes a neural network 101. The neural network 101 receives a network input 141 and processes the input 141 to generate a network output 161. The neural network processing system 100 can store the generated network output 161 in an output data repository or provide the network output for use for some other immediate purpose, e.g., for presentation on a user device or for further processing by another system.

The neural network 101 can be configured to receive any kind of digital data input and to generate any kind of score or classification output based on the input.

For example, if the inputs to the neural network 101 are images or features that have been extracted from images, the output generated by the neural network 101 for a given image may be scores for each of a set of object categories, with each score representing an estimated likelihood that the image contains an image of an object belonging to the category.

As another example, if the inputs to the neural network 101 are Internet resources (e.g., web pages), documents, or portions of documents or features extracted from Internet resources, documents, or portions of documents, the output generated by the neural network 101 for a given Internet resource, document, or portion of a document may be a score for each of a set of topics, with each score representing an estimated likelihood that the Internet resource, document, or document portion is about the topic.

As another example, if the inputs to the neural network processing system 100 are features of an impression context for a particular advertisement, the output generated by the neural network 101 may be a score that represents an estimated likelihood that the particular advertisement will be clicked on.

As another example, if the inputs to the neural network 101 are features of a personalized recommendation for a user, e.g., features characterizing the context for the recommendation, e.g., features characterizing previous actions taken by the user, the output generated by the neural network 101 may be a score for each of a set of content items, with each score representing an estimated likelihood that the user will respond favorably to being recommended the content item.

As another example, if the input to the neural network 101 is text in one language, the output generated by the neural network 101 may be a score for each of a set of pieces of text in another language, with each score representing an estimated likelihood that the piece of text in the other language is a proper translation of the input text into the other language.

As another example, if the input to the neural network 101 is a spoken utterance, a sequence of spoken utterances, or features derived from one of the two, the output generated by the neural network 101 may be a score for each of a set of pieces of text, each score representing an estimated likelihood that the piece of text is the correct transcript for the utterance or sequence of utterances.

In particular, the neural network 101 includes one or more initial neural network layers 110 and a softmax output layer 120. The initial neural network layers 110 can be the input 151 and hidden 152 and 153 of a feedforward or recurrent neural network. The initial neural network layers 110 are configured to receive a neural network input and process the neural network input to generate an initial layer output 160. Generally, the initial layer output 160 is a vector or other ordered collection of numeric values that includes a predetermined number of layer output values, i.e., the number of values that the final initial layer is configured to output.

The softmax output layer 120 is configured to receive the initial layer output 160 and generate a network output 161 based on the initial layer output 160 by applying a softmax function to the layer output 160.

In some implementations, the neural network processing system 100 modifies the initial layer output 160 prior to the initial layer output 160 being processed by the softmax output layer 120. In particular, in these implementations, the neural network processing system 100 modifies the layer output 160 by mapping each initial layer output value to another output value using mapping data. The mapping data may map each value in the initial layer output 160 to a different value, e.g., a more complex value, or include a scaling factor to be applied to the values in the initial layer output 160 before the values are processed by the softmax output layer 120. Mapping initial layer output values before the values are processed by a softmax output layer is described in greater detail below with reference to FIG. 3.

Generally, the softmax function normalizes the layer output 160 so each value in the network output 161 is a value within a predefined range (e.g., the predefined range of real values between 0 and 1, inclusive). The softmax function can also be referred to as the normalized exponential function.

In particular, the neural network processing system 100 processes the network input 141 through the initial neural network layers 110 such that each value in the layer output 160 or, in implementations in which the neural network processing system 100 modifies the values in the layer output 160, each modified layer output value belongs to a predetermined finite set of possible values. Reasons for why the layer output 160 may have this characteristic are described below with reference to FIG. 2.

Because of this, the neural network processing system 100 can process the layer output 160 through the softmax output layer 120 in an efficient manner by computing a count of each of the possible values in the predetermined range and calculating exponentiation measures and normalization factors for the occurring values only once. Generating a corresponding network output 161 for a given layer output 160 in this manner is described in more detail below with reference to FIG. 2.

Figure 2:
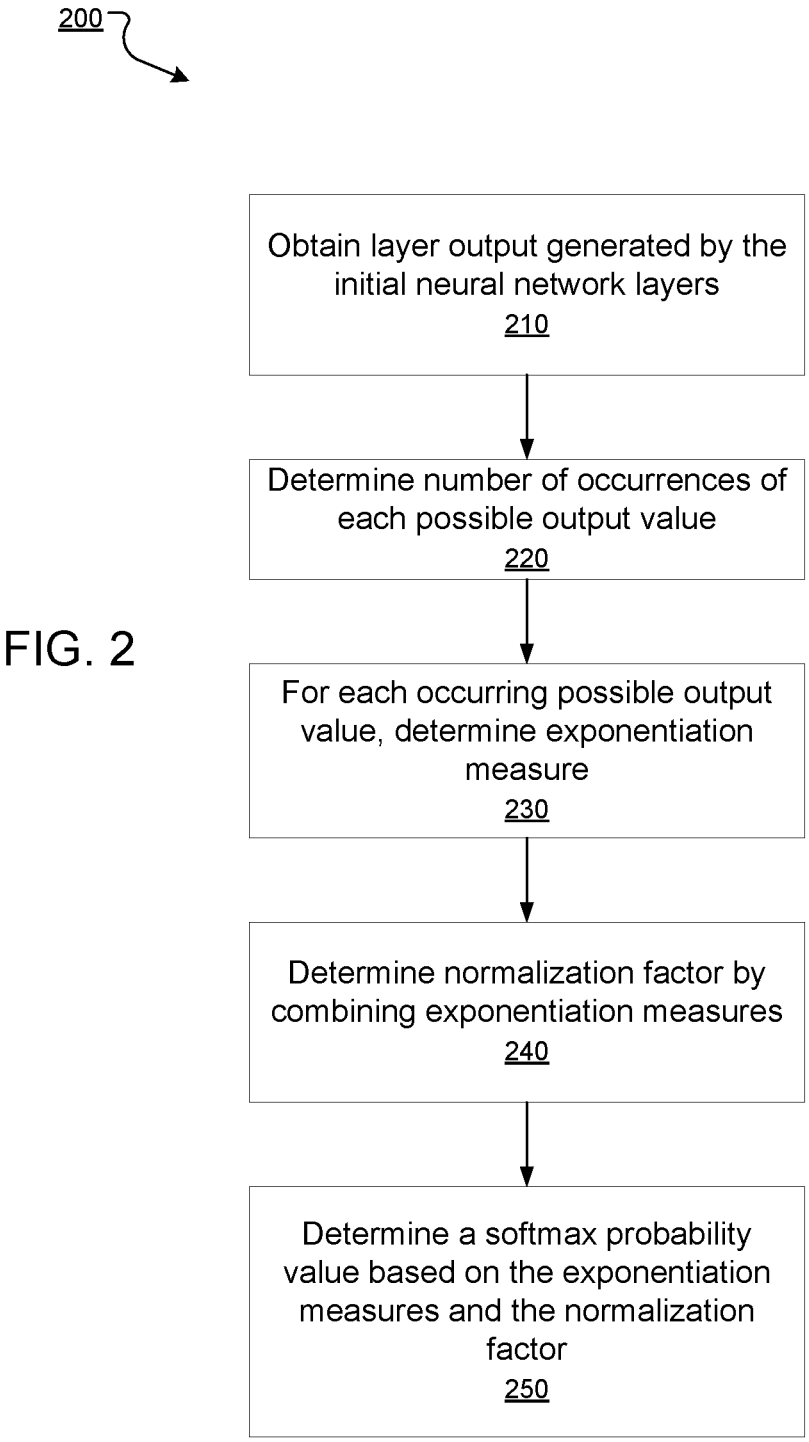
FIG. 2 is a flow chart of an example process for generating a network output from a layer output.

FIG. 2 is a flow chart of an example process 200 for generating a network output from a layer output. For convenience, the process 200 will be described as being performed by a system of one or more computers located in one or more locations. For example, a neural network processing system, e.g., the neural network processing system 100 of FIG. 1, appropriately programmed in accordance with this specification, can perform the process 200.

The system obtains a layer output generated by processing a network input through the one or more initial neural network layers (210). The layer output includes a predetermined number of layer output values, where each layer output value is a respective one of a predetermined finite set of possible output values. The predetermined finite set of possible output values is a finite set of values that may include a smaller number of values than the number of values that may be supplied to a softmax function over a period of time.

The layer output values may include only values from the finite set as a result of the manner in which the processing device generating the layer output performs computations. In some implementations, the layer output is generated by a processing device that performs computation specified by the one or more initial neural network layers with reduced precision, i.e., using quantized arithmetic.

Quantized arithmetic involves representing a first set of values by a second set of values, where the second set includes fewer values than the first set. For instance, the first set of values may be values of a real data type while the second set may be values of a fixed point data type. Fixed point data types represent real values by a number that has a fixed number of digits after the radix point and as such can limit the size of each stored value and the range of possible values that can be stored. In processing systems that use quantized arithmetic, the second set of values to which the values of the first set are mapped may include a predetermined finite set of possible values.

In some implementations, the finite set of possible output values include the set of values of an integer data type that has a bounded number of bits. Examples of the predetermined finite set of possible output values include the integers included in the interval [−128, 127], if the system generates layer outputs that are of an 8-bit signed integer type, or the integers included in the interval [0, 255], if the system generates layer outputs that are of an 8-bit unsigned integer type. The predetermined finite set of output values may include values of any one or more data types. In exemplary implementations, the predetermined finite set of possible output values may include integers in the interval [0, 100], all ASCII characters, and the following real numbers: 1.1, 2.2, 3.3, 4.4, 5.5, 6.6, 7.7, 8.8, and 9.9.

The system determines, for each possible output value in the predetermined finite set, a number of occurrences of the possible output value in the layer output values (220). In exemplary implementations, when the predetermined set of possible output values includes integer values in the range [0, 7], the system counts the number of occurrences each of those integer values in the layer output values. For instance, if the integer 0 has appeared five times in the layer output values, the system determines that count(0)=5.

The system determines an exponentiation measure for each possible output value occurring at least once in the layer output values (230). That is, for each x that is one of the possible output values in the predetermined finite set, if the count of x among the layer output values is one or more, then the system determines an exponentiation measure of x.

Generally, the system determines the respective exponentiation measure of a given possible output value by exponentiating Euler's number (i.e. the number e) by the possible output value or by the result of the multiplication of the possible output value by another value. In some implementations, the system determines the respective exponentiation measure of each respective possible output value by computing $e^X$, where X is the respective possible output value. In some other implementations, the system determines the respective exponentiation measure of each respective possible output value by computing $e^{(X/T)}$, where X is the respective possible output value and T is a temperature value.

In some implementations, the system performs the exponentiation operation on the output of a function, such as an A-law mapping function, a μ-law mapping function, or a compression function.

In some implementations, the system has pre-computed a respective exponentiation measure for each of the possible output values and accesses the corresponding precomputed value to determine the exponentiation measure of the possible output value.

The system determines a normalization factor (i.e., the denominator of the softmax function) for the layer output by combining the exponentiation measures in accordance with the number of occurrences of the possible output values (240). In some implementations, for each member of the set of the possible output values in the predetermined finite set whose corresponding count is one or more, the system multiplies the count for the member by the exponentiation measure for the member. The system then generates the normalization factor by adding the results of those multiplications.

The system determines a softmax probability value for each of the layer output values from the respective exponentiation measure for the layer output value and the normalization factor (250). In particular, the system determines each softmax probability value for a given layer output value by dividing the exponentiation measure for the layer output value by the normalization factor.

In some implementations, each softmax probability value in the network output represents a normalized likelihood of a corresponding condition being satisfied.

For example, when the neural network generates scores for object categories, each softmax probability value corresponds to a different object category and represents the normalized likelihood that the image includes an object belonging to the category.

As another example, when the neural network generates scores for topics of Internet resources, documents, or portions of documents, each softmax probability value corresponds to a different topic and represents the normalized likelihood that the Internet resource, document, or portion of document is about the topic.

As another example, when the neural network generates scores representing the estimated likelihood that advertisements will be clicked on, each softmax probability value represents the normalized likelihood that a particular advertisement will be clicked on.

Figure 3:
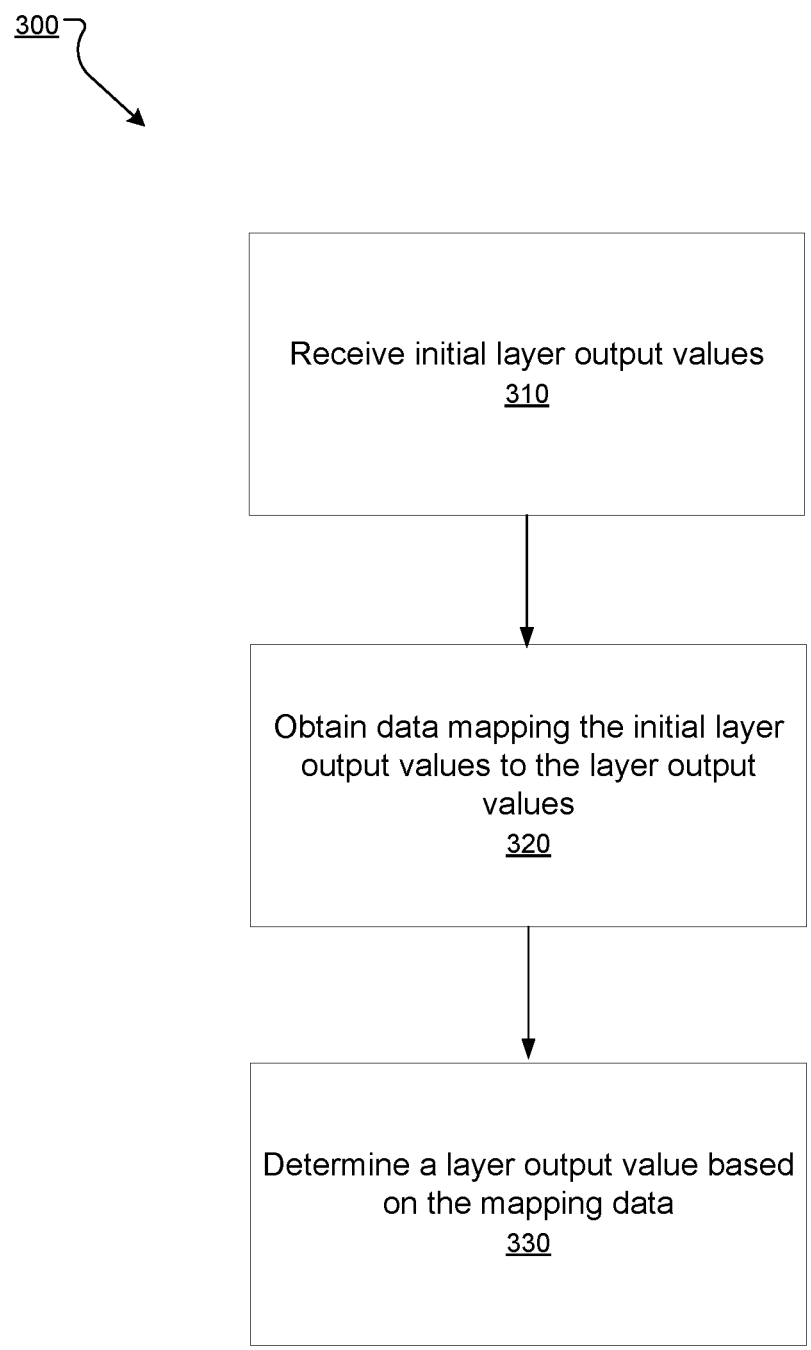
FIG. 3 is a flow chart of an example process for mapping initial layer output values to layer output values.

FIG. 3 is a flow chart of an example 300 for mapping initial layer output values to layer output values. For convenience, the process 300 will be described as being performed by a system of one or more computers located in one or more locations. For example, a neural network processing system, e.g., the neural network processing system 100 of FIG. 1, appropriately programmed in accordance with this specification, can perform the process 300.

The system receives initial layer output values from a processing system that does the processing for the one or more initial neural network layers (310). The initial layer output values are unmapped output values of the one or more initial neural network layers.

The system obtains mapping data defining a mapping from the initial layer output values to the layer output values (320). In exemplary implementations, when the predetermined set of possible output values includes integer values in the range [0, 7], the system obtains data mapping 0 to π, 1 to 2π, 2 to 3π, and so on (i.e. for each integer value x, the system maps x to (x+1)*π). In some implementations, the mapping data specifies a scaling factor for scaling each of the initial layer output values to generate the layer output values. A scaling factor is a number by which an initial layer output value will be multiplied to generate a corresponding layer output value.

The system determines a layer output value for each initial layer output value based on the mapping data (330). If the mapping data specify a layer output value corresponding to an initial layer output value, the system uses that specified value to determine the layer output value. If the mapping data specify a scaling factor by which a layer output value is determined based on the initial layer output value, the system scales the initial layer output value with the scaling factor to determine the layer output value.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A method of processing a network input through a neural network having one or more initial neural network layers followed by a softmax output layer to generate a neural network output for the network input, wherein the initial neural network layers are implemented by a processing system that performs computations specified by the one or more initial neural network layers using quantized arithmetic such that output values generated by the processing system can take only values from a predetermined finite set of values, the method comprising:
   precomputing a respective exponentiation measure for each possible output value of a predetermined finite set of possible output values that can be included in layer outputs generated by processing network inputs through the one or more initial neural network layers using the processing system;
   storing the respective precomputed exponentiation measures;
   obtaining a first layer output generated by the processing system by processing a first network input through the one or more initial neural network layers,
      the first layer output having a plurality of first layer output values, and
      each first layer output value being a respective one of the predetermined finite set of possible output values; and
   processing the layer output through the softmax output layer to generate a first neural network output for the network input, comprising:
      determining, for each possible output value in the predetermined finite set of possible output values, a count of occurrences of the possible output value among the plurality of first layer output values that are in the first layer output;
      for each possible output value that occurs at least once in the in the plurality of layer output values, accessing the stored respective precomputed exponentiation measure for the possible output value, instead of re-computing the respective exponentiation measure;
      determining a normalization factor for the layer output by combining the stored precomputed exponentiation measures for the possible output values that occur in the first layer output at least once in accordance with the counts of occurrences of the possible output values; and
      determining, for each of the plurality of first layer output values, a softmax probability value from the respective precomputed exponentiation measure for the first layer output value and the normalization factor.

2. The method of claim 1, wherein obtaining the first layer output comprises:
receiving a plurality of initial layer output values from the processing system, the plurality of initial layer output values being unmapped output values of the one or more initial neural network layers that are each a respective one of the predetermined finite set of values;
obtaining mapping data defining a mapping from the predetermined finite set of values to the predetermined finite set of possible layer output values; and
determining, for each initial layer output value, a corresponding first layer output value based on the mapping data.

3. The method of claim 2, wherein the mapping data specifies a scaling factor for scaling each of the plurality of initial layer output values to generate the layer output values.

4. The method of claim 1, wherein each of the finite set of possible output values map to a respective value of an integer data type.

5. The method of claim 1, further comprising:
generating the first network input by converting one or more floating point values to fixed point values.

6. The method of claim 1,
wherein determining the respective precomputed exponentiation measure for each possible output value comprises exponentiating Euler's number by a multiplication of the possible output value.

7. The method of claim 1, wherein each softmax probability value is determined by dividing each respective precomputed exponentiation measure by the normalization factor.

8. The method of claim 1, wherein each of the finite set of possible output values is an output of a mapping function.

9. The method of claim 1, wherein each of the finite set of possible output values is an output of a compression function.

10. A system comprising one or more computers and one or more storage devices storing instructions that are operable, when executed by the one or more computers, to cause the one or more computers to perform operations for processing a network input through a neural network having one or more initial neural network layers followed by a softmax output layer to generate a neural network output for the network input, wherein the initial neural network layers are implemented by a processing system that performs computations specified by the one or more initial neural network layers using quantized arithmetic such that output values generated by the processing system can take only values from a predetermined finite set of values, the operations comprising:
precomputing a respective exponentiation measure for each possible output value of a predetermined finite set of possible output values that can be included in layer outputs generated by processing network inputs through the one or more initial neural network layers using the processing system;
storing the respective precomputed exponentiation measures;
obtaining a first layer output generated by the processing system processing a first network input through the one or more initial neural network layers,
the first layer output having a plurality of first layer output values, and
each first layer output value being a respective one of the predetermined finite set of possible output values; and
processing the layer output through the softmax output layer to generate a first neural network output for the network input, comprising:
determining, for each possible output value in the predetermined finite set of possible output values, a count of occurrences of the possible output value among the plurality of first layer output values that are in the first layer output;
for each possible output value that occurs at least once in the in the plurality of layer output values, accessing the stored precomputed exponentiation measure for the possible output value, instead of re-computing the respective exponentiation measure;
determining a normalization factor for the layer output by combining the stored precomputed exponentiation measures for the possible output values that occur in the first layer output at least once in accordance with the counts of occurrences of the possible output values; and
determining, for each of the plurality of first layer output values, a softmax probability value from the respective precomputed exponentiation measure for the first layer output value and the normalization factor.

11. The system of claim 10, wherein obtaining the first layer output comprises:
receiving a plurality of initial layer output values from the processing system, the plurality of initial layer output values being unmapped output values of the one or more initial neural network layers that are each a respective one of the predetermined finite set of values;
obtaining mapping data defining a mapping from the predetermined finite set of values to the predetermined finite set of possible layer output values; and
determining, for each initial layer output value, a corresponding first layer output value based on the mapping data.

12. The system of claim 11, wherein the mapping data specifies a scaling factor for scaling each of the plurality of initial layer output values to generate the layer output values.

13. The system of claim 10, wherein each of the finite set of possible output values map to a respective value of an integer data type.

14. The system of claim 10, further comprising:
generating the first network input by converting one or more floating point values to fixed point values.

15. The system of claim 10,
wherein determining the respective precomputed exponentiation measure for each possible output value comprises exponentiating Euler's number by a multiplication of the possible output value.

16. A non-transitory computer storage medium encoded with instructions that, when executed by one or more computers, cause the one or more computers to perform operations for processing a network input through a neural network having one or more initial neural network layers followed by a softmax output layer to generate a neural network output for the network input, wherein the initial neural network layers are implemented by a processing system that performs computations specified by the one or more initial neural network layers using quantized arithmetic such that output values generated by the processing system can take only values from a predetermined finite set of values, the operations comprising:
precomputing a respective exponentiation measure for each possible output value of a predetermined finite set of possible output values that can be included in layer outputs generated by processing network inputs through the one or more initial neural network layers using the processing system;

storing the respective precomputed exponentiation measures;

obtaining a first layer output generated by the processing system processing a first network input through the one or more initial neural network layers,
the first layer output having a plurality of first layer output values, and
each first layer output value being a respective one of the predetermined finite set of possible output values; and processing the layer output through the softmax output layer to generate a first neural network output for the network input, comprising:
determining, for each possible output value in the predetermined finite set of possible output values, a count of occurrences of the possible output value among the plurality of first layer output values that are in the first layer output;
for each possible output value that occurs at least once in the in the plurality of layer output values, accessing the stored precomputed exponentiation measure for the possible output value, instead of re-computing the respective exponentiation measure;
determining a normalization factor for the layer output by combining the stored precomputed exponentiation measures for the possible output values that occur in the first layer output at least once in accordance with the counts of occurrences of the possible output values; and
determining, for each of the plurality of first layer output values, a softmax probability value from the respective precomputed exponentiation measure for the first layer output value and the normalization factor.

17. The non-transitory computer storage medium of claim 16, wherein obtaining the first layer output comprises:
receiving a plurality of initial layer output values from the processing system, the plurality of initial layer output values being unmapped output values of the one or more initial neural network layers that are each a respective one of the predetermined finite set of values;
obtaining mapping data defining a mapping from the predetermined finite set of values to the predetermined finite set of possible layer output values; and
determining, for each initial layer output value, a corresponding first layer output value based on the mapping data.

18. The non-transitory computer storage medium of claim 17, wherein the mapping data specifies a scaling factor for scaling each of the plurality of initial layer output values to generate the layer output values.

19. The non-transitory computer storage medium of claim 16, wherein each of the finite set of possible output values map to a respective value of an integer data type.

20. The non-transitory computer storage medium of claim 16, wherein determining the respective precomputed exponentiation measure for each possible output value comprises exponentiating Euler's number by a multiplication of the possible output value.

* * * * *